US005684958A

United States Patent [19]
Adachi et al.

[11] Patent Number: 5,684,958
[45] Date of Patent: Nov. 4, 1997

[54] SYSTEM FOR PREVENTING CELL DROPOUT ON THE TRANSMITTING SIDE USING TIMING SIGNAL AND READ COMPLETION SIGNAL TO CONTROL THE RETRANSMISSION OF PREVIOUS CELL

[75] Inventors: Makoto Adachi; Tetsuo Tachibana, both of Kawasaki, Japan

[73] Assignee: Fujitsu Limited, Kanagawa, Japan

[21] Appl. No.: 726,544

[22] Filed: Oct. 7, 1996

Related U.S. Application Data

[63] Continuation of Ser. No. 223,097, Apr. 4, 1994, abandoned.

[30] Foreign Application Priority Data

Sep. 1, 1993 [JP] Japan ................... 5-217118

[51] Int. Cl.$^6$ ............................................. G06F 13/00
[52] U.S. Cl. ..................... 395/200.08; 395/200.03; 395/200.15; 395/182.13; 395/182.16; 370/390; 370/218; 340/825.8; 364/238; 364/238.6; 364/239; 364/264.2; 364/264.5; 364/264.6; 364/267.3; 364/270.5; 364/DIG. 1
[58] Field of Search ................ 395/200.03, 200.08, 395/200.15, 182.13, 182.16; 370/390, 218; 340/825.8; 364/DIG. 1

[56] References Cited

U.S. PATENT DOCUMENTS

| | | | |
|---|---|---|---|
| 3,245,045 | 4/1966 | Randlev | 395/502 |
| 4,445,214 | 4/1984 | Reynolds et al. | 370/85.9 |
| 4,454,383 | 6/1984 | Judd | 178/3 |
| 4,665,519 | 5/1987 | Kirchner et al. | 370/94 |
| 4,829,524 | 5/1989 | Yoshida | 371/32 |
| 4,932,020 | 6/1990 | Pashan et al. | 370/14 |
| 4,941,084 | 7/1990 | Terada et al. | 364/200 |
| 5,161,194 | 11/1992 | Ujiie | 380/48 |
| 5,172,246 | 12/1992 | Yoshida | 358/406 |
| 5,222,063 | 6/1993 | Foglar et al. | 370/60 |
| 5,230,067 | 7/1993 | Buch | 395/275 |
| 5,241,625 | 8/1993 | Epard et al. | 395/200.02 |
| 5,258,752 | 11/1993 | Fukaya et al. | 340/825.8 |
| 5,311,509 | 5/1994 | Heddes et al. | 370/60.1 |
| 5,361,255 | 11/1994 | Diaz et al. | 370/58.1 |
| 5,379,297 | 1/1995 | Glover et al. | 370/60.1 |
| 5,483,521 | 1/1996 | Aramaki | 370/17 |
| 5,497,369 | 3/1996 | Wainwright | 370/60 |

FOREIGN PATENT DOCUMENTS 3-250834 11/1991 Japan.
4-23540 1/1992 Japan.

OTHER PUBLICATIONS

Jon Anderson et al; "Fast Restoration of ATM Networks"; IEEE Journal of Selected Area in Communication. vol 12, No. 1, Jan. 1994.

Primary Examiner—Meng-Al T. An
Attorney, Agent, or Firm—Helfgott & Karas, PC

[57] ABSTRACT

A cell dropout preventing system includes a memory for temporarily storing cells which are obtained by dividing transmitting data into cells having a fixed length, an address generating part for generating a read address signal of the memory, a controlling part for controlling the address generating part based on a timing signal received from a line side and for transmitting to the line side the cell read from the memory by the read address signal generated from the address generating part, and a read completion detecting part for outputting a detection signal when it is detected that one cell is read completely from the memory. The controlling part controls the address generating part so that a cell which is the same as a previous cell is read from the memory and transmitted to the line side when no detection signal is received from the read completion detecting part.

8 Claims, 4 Drawing Sheets

SYSTEM FOR PREVENTING CELL DROPOUT ON THE TRANSMITTING SIDE USING TIMING SIGNAL AND READ COMPLETION SIGNAL TO CONTROL THE RETRANSMISSION OF PREVIOUS CELL

This is a continuation of application Ser. No. 08/223,097, filed Apr. 4, 1994, now abandoned.

BACKGROUND OF THE INVENTION

The present invention generally relates to cell dropout preventing systems, and more particularly to a cell dropout preventing system for preventing dropout of cells during cell transmission in an ATM (asynchronous transmission mode).

In the ATM, data are transmitted in units of cells having a fixed length of 53 bytes consisting of a 5-byte header portion and a 48-byte data portion. In addition, in a system designed to exchange cells via a switched network, a buffer memory is provided to temporarily store the cell so as to absorb a difference in the speeds between the subscriber side and the switched network side. The cell is read from the buffer memory based on a timing signal from the switched network and transmitted. In such a system, a dropout of the cell may occur due to a disturbance or the like to the timing signal. Accordingly, there are demands to prevent such dropout of the cell.

When transmitting the data in the ATM, the data are divided into cell units, and a 5-byte header is added to each cell unit so as to form a 53-bytes cell. Such 53-byte cells are transmitted. As shown in FIG. 1, in the case of a user network interface (UNI), this cell has a fixed length of 53 bytes consisting of a 5-byte header portion HD and a 48-byte data portion DT. The header portion HD of the cell includes a 4-bit general flow control field GFC, a 8-bit virtual path identifier VPI, a 16-bit virtual channel identifier VCI, a 3-bit payload type field PT, a 1-bit cell priority field CLP, and a 8-bit header error control field HEC.

The data portion DT may be made up of an information field header, a payload, and an information field trailer. In the case of a network node interface (NNI), the general flow control field GFC may be omitted and a 12-bit virtual path identifier VPI used instead.

The transmitting side coupled to the switched network divides the data into cell units and adds the header portion HD to each cell unit so as to assemble the cells. The cell is temporarily stored in the buffer memory so as to absorb the difference between the speeds of the switched network side and the subscriber side. The cell is read from the buffer memory based on the timing signal from the switched network and transmitted. In this case, a plurality of cells may temporarily be stored in the buffer memory. On the other hand, at the receiving side, the data portion DT of the received cell is extracted so as to assemble the data.

Since the receiving side receives the data which are divided into cell units, the data cannot be restored completely if one of the cells drops out. Therefore, the transmitting side adds a sequence number to the information field header of the cell when transmitting the cell. For example, the information field header is made up of 1 byte including a 4-bit sequence number protection field and a 4-bit sequence code field, and the sequence number indicating the transmission sequence of the cells is added in the sequence number field. Various systems have been proposed to monitor the sequence number at the receiving side so as to determine whether or not the monitored sequence number is a predetermined sequence number, and to judge that the cell has dropped out if the monitored sequence number is not the predetermined sequence number. Such systems are proposed in Japanese Laid-Open Patent Applications No. 3-250834 and No.4-23540, for example.

As described above, in the system which transmits the cells based on the timing signal from the switched network, the timing signal may be affected by a system switching or the like made in the switched network side. When the timing signal is transmitted to the transmitting side before the transmission amounting to one cell ends, for example, the operation shifts to the transmission process of the next cell. That is, the reading of the next cell stored in the buffer memory starts, and this next cell is transmitted. Therefore, the previous cell is transmitted as an incomplete cell having a byte length shorter than normal. In addition, in the buffer memory, it is judged that the previous cell has already been read and transmitted, and the previous cell may be erased during standby until the timing signal returns to normal.

Furthermore, due to the abnormality of the timing signal, a cell not having the fixed length of 53 bytes is transmitted from the transmitting side. Since such a cell is not a normal cell, it is discarded at the switched network or at the receiving side. In other words, the dropout of the cell occurs, and the receiving side cannot restore the data. Particularly in a system which also regards the information field header for adding the sequence number as the payload for inserting the data, so as to effectively utilize the data portion PT, it is impossible to detect the dropout of the cell at the receiving side, and the cell drops out when an abnormality occurs in the timing signal, thereby introducing a problem in that the data cannot be restored in the receiving side.

SUMMARY OF THE INVENTION

Accordingly, it is a general object of the present invention to provide a novel and useful cell dropout preventing system in which the problems described above are eliminated.

An object of the present invention is to provide a cell dropout preventing system for preventing a cell for dropping out even when a timing signal is transmitted abnormally.

Another and more specific object of the present invention is to provide a cell dropout preventing system comprising memory means for temporarily storing cells which are obtained by dividing transmitting data into cells having a fixed length, address generating means, coupled to the memory means, for generating a read address signal of the memory means, controlling means, coupled to the memory means and the address generating means, for controlling the address generating means based on a timing signal received from a line side, and for transmitting to the line side the cell read from the memory means by the read address signal generated from the address generating means, and read completion detecting means, coupled to the address generating means and the controlling means, for outputting a detection signal when it is detected that one cell is read completely from the memory means, where the controlling means controls the address generating means so that a cell which is the same as a previous cell is read from the memory means and transmitted to the line side when no detection signal is received from the read completion detecting means.

According to the cell dropout preventing system of the present invention, the read completion detecting means detects whether or not the reading of one cell from the memory means has been completed, and supplies the detection signal when it is detected that the reading has been completed. When the timing signal is received from the line side after the detection signal is received from the read completion detecting means, the controlling means supplies a starting address for reading the next cell, a load signal and a clock signal to the address generating means. The read address signal for reading the next cell from the memory means is then generated from the address generating means. If the reading of the previous cell has not been completed, for example, due to a disturbance of the timing signal or the like, a starting address which is the same as the previous starting address is loaded into the address generating means. Hence, the present invention is effective in that the same cell is repeatedly read and transmitted until the timing signal returns to normal, thereby making it possible to prevent the dropout of the cell. The merit of the present invention is that it is not necessary to insert a sequence code in a cell, and that the dropping out of a cell can be prevented by means of prescribed transmission processes, thus allowing the original data to be easily reconstructed at the receiving side.

In addition, the controlling means may determine whether or not the starting address to be loaded into the address generating means should be updated based on the detection signal indicating the completion of the read operation and the timing signal. In this case, the starting address can be set the same as the previous starting address when the disturbance or the like exists in the timing signal, so that the same cell is repeatedly read from the memory means and transmitted, and the dropout of the cell can be prevented.

The read completion detecting means may monitor the read address signal supplied from the address generating means to the memory means so as to determine whether or not the reading of one cell has been completed. It is possible, by use of a relatively simple construction, to detect an incomplete reading of one cell caused by the disturbance of the timing signal or the like, as well as an abnormal read address signal caused by a failure of the address generating means.

Other objects and further features of the present invention will be apparent from the following detailed description when read in conjunction with the accompanying drawings.

DESCRIPTION OF THE PREFERRED EMBODIMENT

First, a description will be given of the operating principle of the present invention, by referring to FIG. 2.

Figure 1:
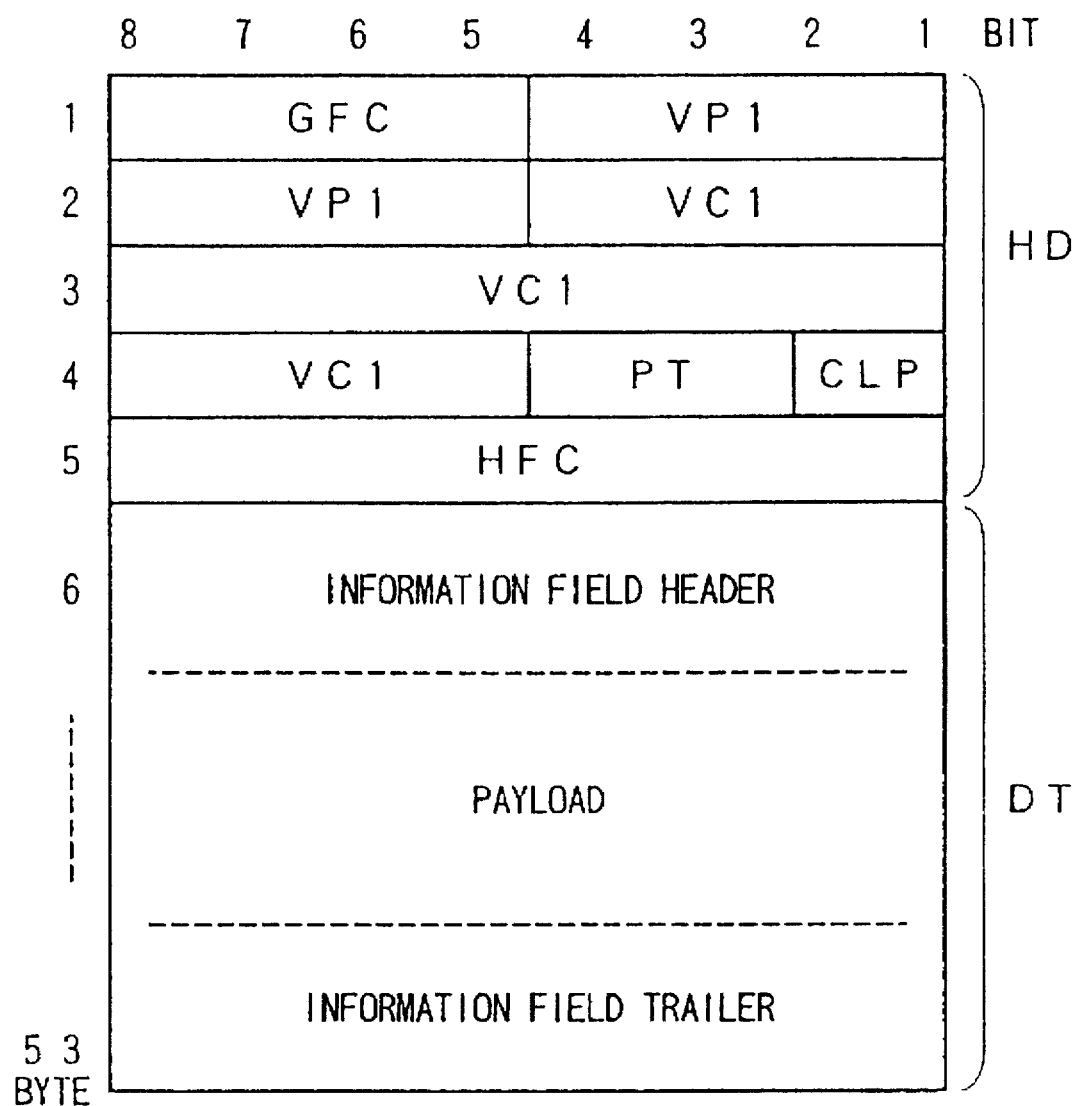
FIG. 1 is a diagram for explaining the construction of a cell.
Figure 2:
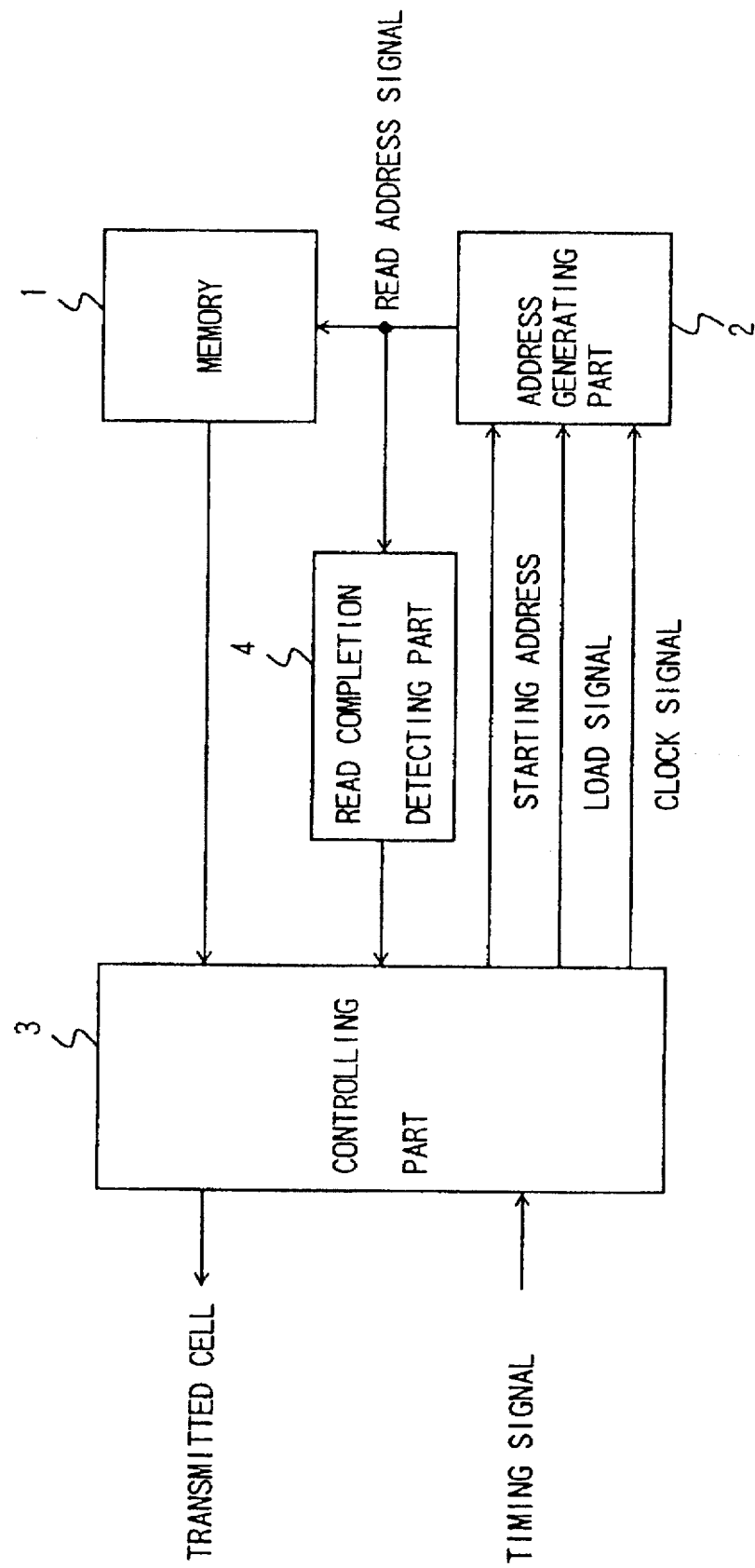
FIG. 2 is a block diagram for explaining the operating principle of the present invention.

A cell dropout preventing system shown in FIG. 2 includes a memory 1 for temporarily storing cells which are obtained by dividing transmitting data into cells having a fixed length, an address generating part 2 for generating a read, address signal for making an access to the memory 1, a controlling part 3 for controlling the address generating part 2 based on a timing signal from the line side and for transmitting to the line side the cell read by the read address signal from the address generating part 2, and a read completion detecting part 4 for detecting the complete read out of one cell from the memory 1. The controlling part 3 controls the address generating part 2 when a detection signal is not supplied from the read completion detecting part 4 so that the cell which is the same as the previously cell is repeatedly read and transmitted to the line side.

When the controlling part 3 is supplied with the detection signal from the read completion detecting part 4 and then with a timing signal from the line side, the controlling part 3 supplies a starting address for reading the next cell, a load signal and a clock signal to the address generating part 2, so that the read address signal of the memory 1 is generated. When the detection signal is not supplied from the read completion detecting part 4 to the controlling part 3 after the timing signal is supplied thereto from the line side, the controlling part 3 supplies the previous starting address, the load signal and the clock signal to the address generating part 2, so that the read address signal of the memory 1 is generated and the same cell is repeatedly read from the memory 1 and transmitted to the line side.

The read completion detecting part 4 may monitor the read address signal from the address generating part 2. In this case, when it is detected that the read address signal changes from the starting address of the stored one cell in the memory 1 to the ending address of this one cell, it is judged that one cell has been read completely, and the detection signal is supplied to the controlling part 3.

The memory 1 temporarily stores an arbitrary number of cells to be transmitted to the line side, the cells are read based on the read address signal from the address generating part 2. The controlling part 3 controls the address generating part 2 to generate the read address signal in response to the timing signal from the line side, and transmits to the line side the cells which are read from the memory 1 based on the read address signal. In this case, the read completion detecting part 4 detects whether or not the reading of one cell from the memory 1 has been completed, and supplies the detection signal to the controlling part 3 when it is detected that the reading has been completed. When the controlling part 3 does not receive this detection signal and receives the next timing signal, a complete cell will not be transmitted, and thus, the controlling part 3 carries out the control to read the same cell again. Therefore, it is possible to prevent a cell from dropping out, because, even when an incomplete cell is transmitted and discarded, a complete cell corresponding to the incomplete cell is subsequently transmitted again. In addition, since the same cell is repeatedly read from the memory 1, the cell temporarily stored in the memory 1 is not erased therefrom even when the cell is transmitted in an incomplete form.

The controlling part 3 supplies to the address generating part 2 the starting address for reading the cell, the load signal for loading the starting address, and the clock signal for generating read address signal. The address generating part 2 generates the read address signal of the memory 1 based on these signals. However, when no detection signal is received from the read completion detecting part 4 and the timing signal is received from the line side, it means that there is a disturbance in the timing signal or a failure in the address generating part 2, and that an incomplete cell has bees transmitted. Hence, in this case, the previous starting address is loaded again into the address generating part 2 so that the read address signal which is the same as the previous read address signal is generated. As a result, the cell which is the same as the previously cell is read from the memory 1 and transmitted to the line side. Therefore, even when the incomplete cell is discarded, the drop out of the cell can be prevented by thereafter transmitting the complete cell.

The read completion detecting part 4 monitors the read address signal from the address generating part 2, and determines whether or not the reading of one cell has been completed, based on the relationship of the starting address and the ending address of the one cell. For example, the read completion detecting part 4 determines that the reading of a cell consisting of 53 bytes from the starting address has been completed when the number of times the read address signal supplied to the memory 1 is generated is counted and it is detected that the count has reached 53. On the other hand, since the ending address of the cell becomes 53 if the starting address is 0, for example, the difference between the starting address and the ending address becomes 53. In other words, by obtaining the difference between the starting address and the ending address of one cell, it may also be detected that the reading of the one cell has been completed when the difference becomes 52.

Next, a description will be given of an embodiment of a cell dropout preventing system according to the present invention, by referring to FIG. 3.

Figure 3:
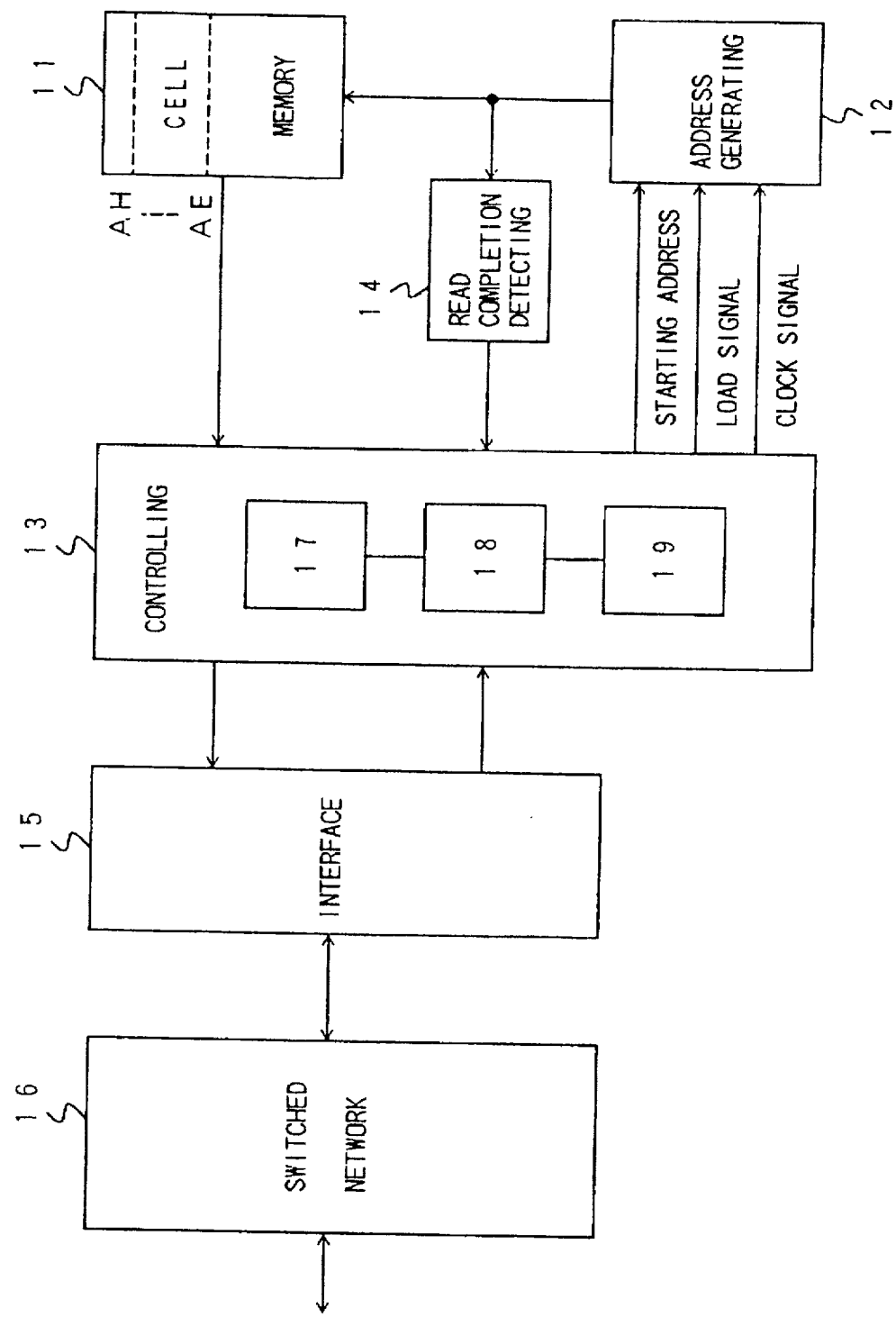
FIG. 3 is a system block diagram showing an embodiment of a cell dropout preventing system according to the present invention.

FIG. 3 shows the embodiment of the present invention. A cell dropout preventing system shown in FIG. 3 includes a memory 11, an address generating part 12, a controlling part 13, a read completion detecting part 14, an interface part 15, a switched network 16, a starting address forming part 17, a load signal forming part 18, and a clock signal forming part 19.

The memory 11 corresponds to the aforementioned buffer memory for absorbing the difference in the transmission speeds of the switched network and the subscriber side, and may be formed by a random access memory (RAM), a first-in-first-out (FIFO) memory and the like. An arbitrary number of cells are written into the memory 11 by a known construction not shown. The temporarily stored cell is held in the memory 11 at least until the reading of the cell is completed. The controlling part 13 includes the starting address forming part 17 for forming the starting address of each cell temporarily stored in the memory 11, the load signal forming part 18 for forming the load signal, and the clock signal forming part for forming the clock signal based on the timing signal from the switched network 16 side, and the functions thereof can be realized by arithmetic functions of a microprocessor, for example.

The address generating part 12 loads the starting address in response to the load signal and generates read address signal of the memory 11 by counting the clock signal. The read completion detecting part 14 monitors the read-address signal from the address generating part 12 and counts the number of times the read address signal is generated. When the count of the read address signal reaches 53, the read completion detecting part 14 judges that the reading of one cell has been completed because in this case the number of times the read address signal is generated corresponds to 53 bytes. Alternatively, the read completion detecting part 14 obtains the difference between the read address signal indicating the starting address and the read address signal indicating the ending address, and judges that the reading of one cell has been completed when the difference becomes 52. Accordingly, it is possible to realize the functions of the read completion detecting part 14 by using arithmetic functions of a microprocessor or the like. When the read completion detecting part 14 detects the completion of the reading of one cell, the read completion detection part 14 supplies a detection signal to the controlling part The interface part 15 supplies a timing signal having a period of 53 bytes to the controlling part 13 based on the timing signal from the switched network 16. The controlling part is controls the address generating part 12 based on the timing signal as described above, so that the address generating part 12 generates the read address signal of the memory 11. In a case where an arbitrary number of cells are successively stored in the memory 11, the starting address forming part 17 forms the next starting address by advancing the starting address by 53 bytes when the timing signal is received after receiving the detection signal from the read completion detecting part 14. On the other hand, when the starting address forming part 17 receives the timing signal when no detection signal is received from the read completion detecting part the starting address forming part 17 outputs the previous starting address as it is since the reading of one cell has not been completed in this case. In either case, the load signal forming part 18 generates the load signal.

Assuming, for example, that the starting address and the ending address of the cell to be transmitted next, out of the arbitrary number of cells temporarily stored in the memory 11, respectively are AH and AE, the controlling part 13 controls the starting address forming part 17 to form the starting address AH when the timing signal is received from the interface part 15 after receiving the detection signal from the read completion detecting part 14. The controlling part 13 also controls the load signal forming part 18 to generate the load signal, and controls the clock signal forming part 19 to generate the clock signal. Hence, the starting address AH, the load signal and the clock signal are supplied to the address generating part 12. As a result, the address generating part 12 loads the starting address AH in response to the load signal and starts counting the clock signal.

The address generating part 12 basically outputs the count of the clock signal as the read address signal. In other words, the address generating part 12 successively generates the read address signal amounting to 53 bytes from the starting address AH to the ending address AE of each stored cell. When the read address signal amounting to 53 bytes is generated, the reading of one cell is completed, and the detection signal is supplied from the read completion detecting part 14 to the controlling part 13. The cell read from the memory 11 is transmitted to the line side via the controlling part 13. In other words, the read cell is transmitted to the switched network 16 via the interface part 15 and is transferred to the receiving side via a path in the switched network 16 depending on the content of the header portion HD.

When the next timing signal is supplied to the controlling part 13, the starting address output from the starting address forming part 17 is (AE+1) which indicates the address next to the ending address AE of the previous Cell. This starting address (AE+1) is loaded into the address generating part 12 in response to the load signal from the load signal forming part 18. When the address generating part 12 starts counting of the clock signal from the clock signal generating part 19, the address generating part 12 successively generates the read address signal amounting to 53 bytes staring from the starting address (AE+1). The next cell is read from the memory 11 based on the successively generated read address signal.

On the other hand, when the controlling part 13 receives the timing signal before receiving the detection signal from the read completion detecting part 14 due to the disturbance in the timing signal or the like, the reading of one cell has not been completed. Therefore, in this case, the starting address output from the starting address forming part 18 of the controlling part 13 is set the same as the previous starting address AH and is supplied to the address generating part 12. Accordingly, the address generating part 12 loads this starting address AH in response to the load signal and starts counting the clock signal. As a result, the read address signal becomes the same as the previous read address signal, and the same cell is read again from the memory In the case where the reading of one cell is not completed, a cell having a length shorter than the normal 53 bytes is transmitted and subsequently discarded, thereby generating the cell dropout. However, since the cell that drops out is held in the memory 11, this cell can be read from the memory 11 again for transmission, the reading is repeated until the reading of one cell is completed. Therefore, since the normal cell is transmitted when the timing signal becomes normal, it is possible to positively prevent the cell dropout.

Figure 4:
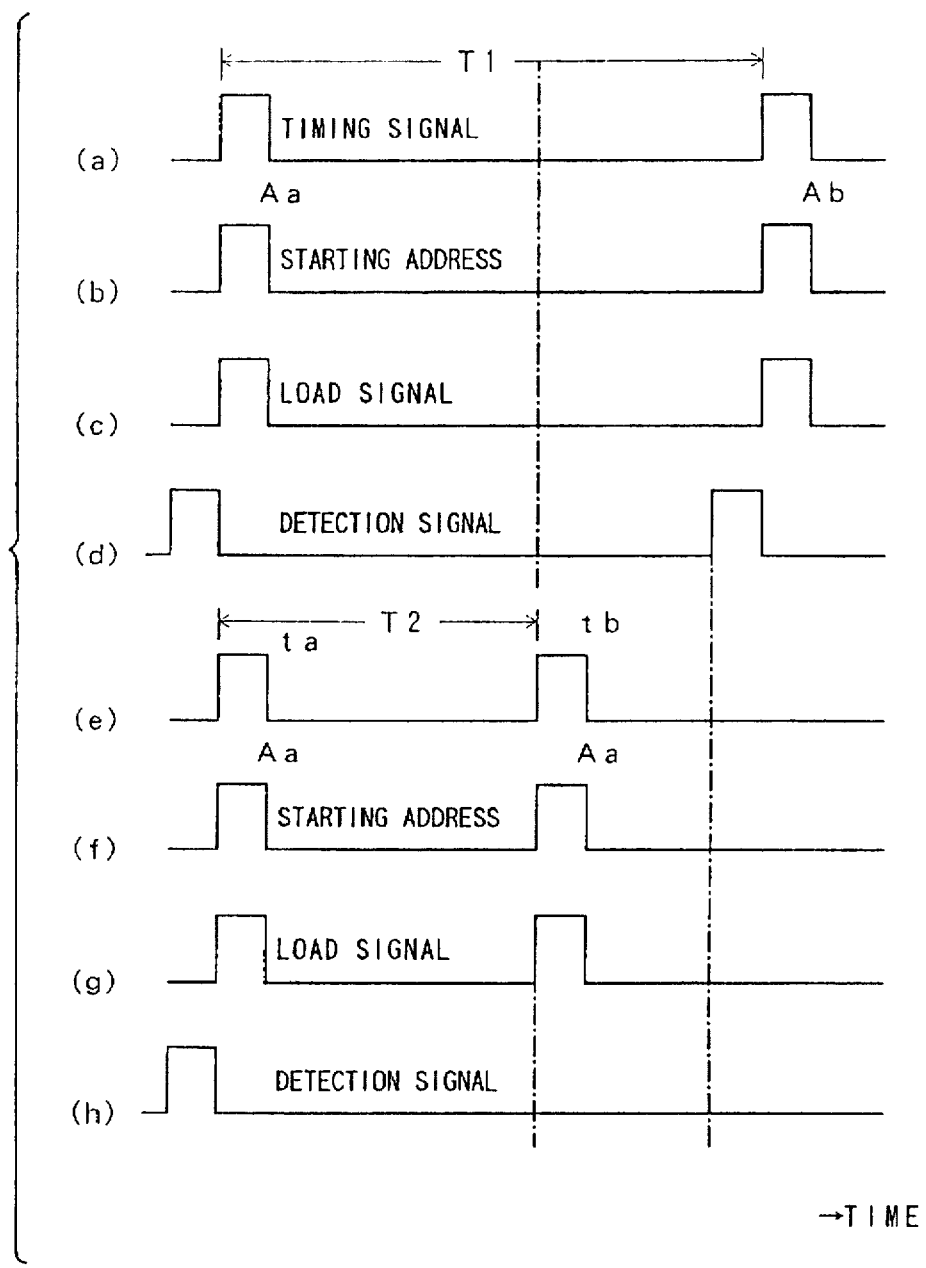
FIG. 4 is a timing chart showing timings (a) through (h) for explaining the operation of the embodiment.

FIG. 4 is a timing chart for explaining the operation of the above described embodiment. In FIG. 4, (a) shows a normal timing signal supplied to the controlling part 13, (b) shows a starting address supplied from the controlling part 13 to the address generating part 12, (c) shows a load signal supplied from the controlling part 13 to the address generating part 12, (d) shows a detection signal supplied from the read completion detecting part 14 to the controlling part 13, (e) shows an abnormal timing signal, (f) shows an abnormal starting address, (g) an abnormal load signal, and (h) shows an abnormal detection signal.

As shown in FIG. 4 (a), the normal timing signal supplied to the controlling part 13 has a period T1 amounting to 53 bytes. Based on this normal timing signal, the starting addresses Aa and Ab shown in FIG. 4 (b) from the controlling part 13 are loaded into the address generating part 12 in response to the load signal shown in FIG. 4 (c). As a result, the read address signal is generated and input to the memory 11. When the detection signal shown in FIG. 4 (d) is supplied to the controlling part 13 following the completion of the reading of 53 bytes, the cells are sequentially read from the memory 11.

A disturbance in the timing signal may occur, for example, as a result of switching the system or the like, and in such a case, a period T2 of a next timing signal tb which is next to the timing signal ta becomes shorter than the normal period T1 as shown in FIG. 4 (e). In this case, a starting address Aa shown in FIG. 4 (f) is loaded into the address generating part 12 in response to a load signal shown in FIG. 4 (g) based on the timing signal ta. When the next timing signal tb is received, the reading of one cell starting from the starting address Aa is not yet completed, and a detection signal shown in FIG. 4 (h) is not output. In this case, the starting address in accordance with the timing signal tb is set the same as the previous starting address Aa.

Accordingly, the reading of the cell is started from starting address Aa which is the same as the previous starting address, so that the same cell is repeatedly transmitted. This reading process is repeated until the reading of one cell from the memory 11 is completed, that is, until the timing signal returns to normal. When the timing signal returns to normal, the cell transmitted immediately before is complete, and the detection signal from the read completion detecting part 14 is supplied to the controlling part 13. As a result, the starting address is advanced and the transmission of the next cell is started. Since the cell is held in the memory 11 and repeatedly transmitted until the reading thereof is completed, the dropout of the cell is prevented even when the incomplete cell is discarded.

Further, the present invention is not limited to the above described embodiments, and various variations and modifications may be made without departing from the scope of the present invention.

What is claimed is:

1. A cell dropout preventing system for use in a switched network at a transmitting side, comprising:

memory means for temporarily storing cells which are obtained by dividing transmitting data into cells having a fixed length;

address generating means, coupled to said memory means, for generating a read address signal of said memory means;

controlling means, coupled to said memory means and said address generating means, for controlling said address generating means based on a timing signal received by said controlling means from a line side, and for transmitting to said line side a cell read from said memory means by the read address signal generated from said address generating means; and read completion detecting means, coupled to said address generating means and said controlling means, for outputting a detection signal to said controlling means when said read completion detecting means detects that one cell is read completely from said memory means, said controlling means controlling said address generating means so that a cell which is the same as a previously read cell is read from said memory means and is transmitted to the line side when no detection signal is received from said read completion detecting means, wherein the memory means, the address generating means, the controlling means, the read completion detecting means, and the controlling means are located at the transmitting side of the cell dropout preventing system.

2. The cell dropout preventing system as claimed in claim 1, wherein said controlling means comprises:

means for supplying to said address generating means a starting address for reading a next cell, a load signal and a clock signal when the timing signal is received from said line side after the detection signal is received by said controlling means from said read completion detecting means so that said address generating means generates the read address signal; and means for supplying to said address generating means a previous starting address, a load signal and a clock signal when no detection signal is received from said read completion detecting means by said controlling means when the timing signal is received from said line side so that said address generating means generates the read address signal, so that same cell is repeatedly read from said memory means and is transmitted to said line side.

3. The cell dropout preventing system as claimed in claim 2, wherein said read completion detecting means monitors the read address signal from said address generating means and supplies the detection signal to said controlling means by judging that one cell is read completely from said memory means when said read completion detecting means detects that the read address signal has changed from a starting address of one cell within said memory means to an ending address of said one cell.

4. The cell dropout preventing system as claimed in claim 1, wherein said read completion detecting means monitors the read address signal from said address generating means and supplies the detection signal to said controlling means by judging that one cell is read completely when said read completion detecting means detects that the read address signal has changed from a starting address of one cell within said memory means to an ending address of said one cell.

5. The cell dropout preventing system as claimed in claim 1, wherein said controlling means comprises:

starting address forming means for forming a next starting address by advancing a starting address by an arbitrary amount when the timing signal is received by said controlling means after receiving the detection signal from said read completion detecting means, and for outputting a previous starting address as it is when the timing signal is received but no detection signal is received by said controlling means from said read completion detecting means; and load signal forming means for generating the load signal regardless of whether said starting address is advanced in said starting address forming means.

6. The cell dropout preventing system as claimed in claim 1, wherein said read completion detecting means monitors the read address signal from said address generating means and counts a number of times the read address signal is generated, and detects that reading of said one cell is completed when a count of the read address signal reaches a predetermined number.

7. The cell dropout preventing system as claimed in claim 1, wherein said read completion detecting means obtains a difference between the read address signal indicating a starting address of said one cell and the read address signal indicating an ending address of said one cell and detects that reading of said one cell is completed when the difference becomes a predetermined value.

8. The cell dropout preventing system as claimed in claim 1, wherein said memory means is selected from a group consisting of a random access memory and a first-in-first-out memory.

* * * * *